United States Patent [19]

Huemke et al.

[11] Patent Number: 5,283,269

[45] Date of Patent: Feb. 1, 1994

[54] EPOXY RESIN WITH AMINOMETHYLENE GROUPS

[75] Inventors: Klaus Huemke, Friedelsheim; Dirk Lawrenz, Ditzingen; Ulrich Heimann, Muenster, all of Fed. Rep. of Germany

[73] Assignee: BASF Lacke + Farben Aktiengesellschaft, Muenster, Fed. Rep. of Germany

[21] Appl. No.: 4,602

[22] Filed: Jan. 14, 1993

[30] Foreign Application Priority Data

Jan. 17, 1992 [DE] Fed. Rep. of Germany ....... 4201054

[51] Int. Cl.$^5$ .................... C08G 59/14; C09D 5/44
[52] U.S. Cl. .................... 523/404; 523/415; 525/528; 528/45; 528/73; 204/181.7; 428/418
[58] Field of Search ............ 523/404, 415; 525/528; 528/45, 73; 208/181.7; 428/418

[56] References Cited

U.S. PATENT DOCUMENTS 4,939,216 7/1990 Lawrenz et al. .................. 525/454
4,977,203 12/1990 Kitabatake .......................... 528/361
5,055,168 10/1991 Lawrenz et al. .................. 204/181.7

FOREIGN PATENT DOCUMENTS 135825 4/1985 European Pat. Off. .
2007672 5/1979 United Kingdom .

*Primary Examiner*—Frederick Krass
*Attorney, Agent, or Firm*—Keil & Weinkauf

[57] ABSTRACT

Epoxy resins with urethane groups, containing on average per molecule from 0.5 to 5 groups of the formula I

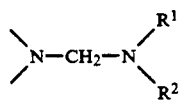

where the substituents $R^1$ and $R^2$ are $C_1$–$C_8$-alkyl groups, which may also be linked together to form five- or six-membered rings, which may contain an oxygen atom, or are each phenyl, are useful in electrocoating.

5 Claims, No Drawings

EPOXY RESIN WITH AMINOMETHYLENE GROUPS

The present invention relates to novel epoxy resins with urethane groups, containing on average per molecule from 0.5 to 5 groups of the formula I

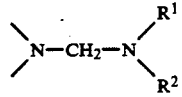

where the substituents $R^1$ and $R^2$ are $C_1$–$C_8$-alkyl groups, which may also be linked together to form five- or six-membered rings, which may contain an oxygen atom, or are each phenyl.

The present invention also relates to the preparation of the novel epoxy resins and to the use thereof as crosslinkers. The present invention further relates to electrocoating binders which contain the novel epoxy resins, to an electrocoating process using these binders, and to articles coated therewith.

EP-A-0 304 854 discloses binders for cathodic electrocoating which as crosslinker component contain a mixture of blocked polyisocyanates and/or urea condensation products and at least one phenolic Mannich base. It is true that the baking temperature is low at about 120° C., but electrocoating baths prepared from such binders are not sufficiently stable at about 30° C.

It is an object of the present invention to provide crosslinkers which in electrocoating binders combine low baking temperatures and good coating properties with good bath stability and a long storage life.

We have found that this object is achieved by the epoxy resins defined at the beginning, a process for preparing them, and electrocoating binders which contain these epoxy resins.

The epoxy resins of the invention are obtained by starting from hydroxylic resins, ie. resins with hydroxyl groups.

These resins are prepared from a polyhydroxy compound, preferably an aromatic hydroxy compound, particularly preferably a polyhydric phenol, on the one hand, and an epihalohydrin, preferably epichlorohydrin, on the other in such a way that the polyhydroxy compounds end up in the terminal positions. The epihalohydrin may be replaced in part or in full with polyethers having terminal epoxy groups, such polyethers being prepared for example from ethylene oxide, propylene oxide or tetrahydrofuran. The synthesis of the resin is customarily carried out in the presence of a catalyst such as triphenylphosphine. Suitable polyhydroxy compounds are for example
4,4'-dihydroxybenzophenone,
1,1-bis(4-hydroxyphenyl)ethane,
1,1-bis(4-hydroxyphenyl)isobutane,
2,2-bis(4-hydroxy-3-tert-butylphenyl)propane,
bis(4-hydroxynaphthyl)methane,
1,5-dihydroxynaphthalene
and preferably 2,2-bis(4-hydroxyphenyl)propane (bisphenol A).

Other suitable polyhydroxy compounds are novolaks.

The resins mentioned preferably have an average molecular weight of from 500–5000.

These hydroxylic resins are reacted with partially capped polyfunctional isocyanates.

Suitable polyfunctional isocyanates are aliphatic, alicyclic and/or aromatic isocyanates, eg. 4,4'-diisocyanatodiphenylmethane and its positional isomers, 1,6-diisocyanatohexane, diisocyanatonaphthalene, trimeric isophorone diisocyanate, trimeric toluylene diisocyanate, trimeric 1,6-diisocyanatohexane and preferably isophorone diisocyanate and/or toluylene diisocyanate.

Suitable capping agents are for example monohydric alcohols, preferably short-chain, aliphatic alcohols such as methanol, ethanol, propanol or isopropanol, secondary amines, preferably short-chain aliphatic amines such as dimethylamine, diethylamine, dipropylamine or dibutylamine, alkanolamines, preferably tertiary alkanolamines such as tri(n-propanol)amine or tri(isopropanol)amine, and mixtures thereof.

The polyfunctional isocyanates are reacted in a conventional manner with the capping agents in such amounts that on average one isocyanate group per molecule is not capped.

The hydroxylic resins are reacted with the partially capped polyfunctional isocyanates in such amounts that at the very least all the aromatic hydroxyl groups of the resin are reacted. For this reaction it is advisable not to exceed a reaction temperature of 90° C., so as to prevent curing due to crosslinking reactions.

The reaction product thus obtained is reacted with formaldehyde or preferably a formaldehyde donor such as paraformaldehyde and a secondary amine $HNR^1R^2$ to form the epoxy resin of the invention.

The radicals $R^1$ and $R^2$ in the secondary amine are preferably identical. The amine is particularly preferably dimethylamine, diethylamine, dipropylamine or dibutylamine. It is also possible to use morpholine as amino component.

The reaction to form the epoxy resin of the invention can be carried out at from 40° to 100° C., preferably at from 70° to 90° C. It is preferably carried out in a solvent so as to reduce the viscosity of the reaction mixture. The amounts range from 1 to 50% by weight, but in some instances it may be also be sufficient to use small amounts such as 1–5% by weight, based on the total batch. It is possible to use any inert solvent, in particular those solvents having a boiling point within the range 100°–250° C. such as toluene, xylene, isobutanol, 1,2-propylene glycol monophenyl ether, methyl isobutyl ketone or mixtures thereof. The water formed in the course of the reaction can subsequently be distilled off under reduced pressure or be removed azeotropically from the reaction mixture with the aid of an azeotrope former such as toluene.

The epoxy resins of the invention can be used as crosslinking components for resins with primary and/or secondary amino groups, which resins will hereinafter be referred to as base resins. These base resins are for example urea/formaldehyde or melamine/formaldehyde resins, homo and co polymers of amides of unsaturated carboxylic acids and also, in particular, amino-containing epoxy resins. Particularly suitable products contain not only amino groups but also hydroxyl groups suitable for crosslinking.

Urea-formaldehyde base resins are those having an average molecular weight of from 200 to 5000 and a urea:formaldehyde ratio of from 0.1:1 to 10:1.

Melamine-formaldehyde base resins ideally have an average molecular weight of from 200 to 5000. The ratio of melamine to formaldehyde ranges from 0.1:1 to 1:1.

Further suitable base resins include polymerization products of amides of unsaturated carboxylic acids such as methacrylic acid and primary or secondary amines such as diethylamine. The average molecular weight should be within the range from 500 to 5000. These polymerization products may contain copolymerized units, for example of styrene, acrylonitrile or acrylic esters such as hydroxyethyl acrylate, in amounts of from 1 to 20% by weight.

Amino-containing epoxy resins make good base resins in particular with regard to use as binder in cathodic electrocoating. Preference is given to those having an average molecular weight of from 500 to 20,000 and an amine number of from 100 to 150. As epoxy resin component these amino-epoxy resins are preferably based on glycidyl ethers of polyphenols, which are preparable in a conventional manner by etherification with an epihalohydrin. Suitable polyphenols are for example those mentioned in connection with polyhydroxy compounds as basic building block for epoxy resins according to the invention.

The epoxy component may also be a polyfunctional glycidyl ether of aliphatic polyhydric alcohols such as ethanediol, diethylene glycol, 1,2-propanediol, 1,3-propanediol, 1,5-pentanediol, 1,2,6-hexanetriol or glycerol. Glycidyl-containing novolaks can also be used as epoxy component Preference is given to epoxy components having an average molecular weight of 180–2500.

Secondary amine functions can be incorporated into the epoxy resins by reaction of an epoxy group with primary amines. These amines may also contain hydroxyl groups or further amino groups Secondary alkanolamines such as methylethanolamine are preferred.

A very convenient way of introducing the amine component into the amino-epoxy resins is by means of amide-amines, ie. condensation products of dicarboxylic acids, preferably dimeric fatty acids, and polyamines, preferably aliphatic polyamines, eg. diethylenetriamine and/or triethylenetetramine. It is also possible to include terminating monocarboxylic acids, preferably $C_{12}$–$C_{20}$-carboxylic acids, in the amide-amine. Of particular suitability are those products whose amine number is within the range from 200 to 500.

It is advantageous for the structure of the aminoepoxy resins also to incorporate in the resins, in the course of the reaction of the glycidyl ethers with suitable amines, long-chain alkylphenols, preferably $C_6$–$C_{18}$-alkylphenols, which ensure branching in the resin.

The reaction of the epoxy resin with the amine component is preferably carried out at 50°–90° C. in a polar solvent such as isobutanol or sec-butanol which is present in amounts of 5-30% by weight of the batch. The reaction will in general have ended after 2 hours.

The binders of the invention become dispersible in water on partial or complete neutralization. Suitable neutralizing acids are preferably carboxylic acids such as formic acid, acetic acid, propionic acid or lactic acid, but also mineral acids such as acids of phosphorus. Neutralization of the binder may be effected by neutralizing its components (A) and (B) together, but preferably they are neutralized separately. This is done by adding an acid to the individual components, dispersing the mixture in water and if necessary removing any organic solvent. The respective individual dispersions can be mixed and diluted with water to a desired solids content To prepare electrocoating baths based on the binders of the invention it is possible to add further binders, pigments and the customary electrocoating auxiliaries and additives such as fillers, corrosion inhibitors, dispersants, antifoams and/or solvents The electrocoating process itself is carried out in a conventional manner.

If binders according to the invention are used, the coating baths are stable at 30° C. for several weeks, although, on the other hand, the baking temperature required is only around 120°–130° C. for 20 minutes. Under these conditions it is possible to produce paint films with a uniform thickness of from 20 to 25 µm. The paint films exhibit excellent corrosion protection not only on phosphatized steel but also on untreated steel. The fact that corrosion protection is very good on both kinds of substrate represents an advantage in automobile production wherever a spray phosphatization does not ensure uniform pretreatment of all metal parts prior to coating.

PREPARATION EXAMPLES

EEW: epoxy equivalent weight

EXAMPLE 1

Preparation of a Novel Epoxy Resin (A1)

1.50 kg of a diglycidyl ether based on bisphenol A and epichlorohydrin (EEW 188) were heated together with 2.20 kg of bisphenol A (6.47 mol) and 1.25 g of triphenylphosphine at 150°–160° C. for 2 h, dissolved in 2 kg of methyl isobutyl ketone and admixed at 60°–90° C., in the course of 90 min, with a solution of a half-capped toluylene diisocyanate mixture.

The partially capped toluylene diisocyanate was prepared by reacting a technical grade mixture of 1.95 kg of 2,4-diisocyanatotoluene (11.2 mol) and 490 g of 2,6-diisocyanatotoluene (2.8 mol) with a mixture of 720 g of dimethylaminopropanol (9.1 mol) and 320 g of ethanol (7 mol) at 50° C. in 900 g of toluene.

The solution of the reaction product was admixed with 1.55 kg of dibutylamine (12 mol) and 360 g of paraformaldehyde (12 mol of $CH_2O$), maintained at 90°–95° C. for 6 h and then stripped of the water of reaction.

The solids content of the solution was 80% and the amine number of the resin was 120 mg/g.

EXAMPLE 2

Preparation of a Novel Epoxy Resin (A2)

940 g of a diglycidyl ether based on bisphenol A and epichlorohydrin (EEW 188) were heated together with 1.70 kg of bisphenol A (5.00 mol) and 1.20 g of triphenylphosphine at 150°–160° C. for 2 h, dissolved in 700 g of toluene and admixed at 50°–70° C., in the course of 60 min, with a solution of a half-capped toluylene diisocyanate mixture.

The partially capped toluylene diisocyanate was prepared by reacting a technical grade mixture of 1.05 kg of 2,4-diisocyanatotoluene (6 mol) and 260 g of 2,6-diisocyanatotoluene (1.5 mol) with 1.03 kg of dibutylamine (8 mol) at 50° C. in 600 g of toluene The solution of the reaction product was admixed with 1.16 kg of dibutylamine (9 mol) and 270 g of paraformaldehyde (9 mol of $CH_2O$) and also with 300 g of isobutanol, maintained at 80° C. for 4 h and then stripped of the water of reaction. The solids content of the solution was 80% and the amine number of the resin was 59 mg/g.

USE EXAMPLES

1. Preparation of Electrocoating Bath Dispersions a) Preparation of Aqueous Dispersions of Novel Resins A1 and A2

Each resin was admixed with acetic acid, heated to 50° C. and dispersed in 460 g of water. 225 g of water were added to distill off 225 g of a solvent/water mixture.

The dispersions had a solids content of 35% and were homogeneous and stable.

|  | A1 | A2 |
| --- | --- | --- |
| Resin [g] | 400 | 400 |
| Acetic acid [g] | 11.6 | 17.3 | b) Preparation of Dispersions of Base Resins B1 and B2 b₁) Preparation of Base Resin B1

11.3 kg of a diglycidyl ether based on bisphenol A and epichlorohydrin (EEW 188) were heated together with 3.08 kg of bisphenol A (9.06 mol) and 4.30 g of triphenylphosphine at 130° C. in 750 g of 1,2-propylene glycol monophenyl ether until an EEW of 435 had been reached, dissolved in 5 kg of isobutanol and 500 g of butylglycol, and admixed at 50°–55° C. with 1.01 kg of methylethanolamine (13.5 mol). On attainment of an EEW of 750, 1.5 kg of isobutanol, 170 g of butylglycol and 4.40 kg of a solution of an amide-amine were added, and the mixture was maintained at 55° C. for 2 h.

The amide-amine was prepared by reacting 5.15 kg of diethylenetriamine (50 mol), 7.25 kg of dimeric fatty acid (13.0 mol) and 1.40 kg of linseed oil fatty acid (5.0 mol) in 1.5 kg of xylene at 150°–175° C. with distillative removal of the water of reaction (amine number 464 mg/g).

Base resin B1 had a solids content of 70% and an amine number of 145 mg/g.

b₂) Preparation of Base Resin B2

8.27 g of a diglycidyl ether based on bisphenol A and epichlorohydrin (EEW 188) were heated together with 2.28 kg of bisphenol A (6.70 mol) and 3.20 g of triphenylphosphine at 130° C. in 550 g of 1,2-propylene glycol monophenyl ether until an EEW of 435 had been reached, dissolved in 3.2 kg of isobutanol and 360 g of butylglycol, and admixed at 50°–55° C. with 750 g of methylethanolamine (10 mol). On attainment of an EEW of 745, 1 kg of isobutanol, 100 g of butylglycol and 2.60 kg of a solution of an amide-amine were added, and the mixture was maintained at 55° C. for 2 h. The base resin had a solids content of 70% and an amine number of 147 mg/g.

The amide-amine was prepared by reacting 5.29 kg of triethylenetetramine (36.2 mol), 4.93 kg of dimeric fatty acid (8.8 mol) and 950 g of linseed oil fatty acid (3.4 mol) in 1.1 kg of xylene at 150°–175° C. with distillative removal of the water of reaction (amine number 556 mg/g).

b₃) Preparation of Dispersions of Base Resins B1 and B2

Method as for 1a), except for dispersing in 1.2 kg of water, addition of a further 1.2 kg of water and distillative removal of 1.2 kg of the solvent/water mixture. The dispersions were homogeneous and stable.

|  | B1 | B2 |
| --- | --- | --- |
| Resin [g] | 1200 | 1200 |
| Acetic acid [g] | 23.5 | 18.3 | c) Preparation of a Pigment Paste P 640 g of diglycidyl ether based on bisphenol A and epichlorohydrin (EEW 485) and 160 g of a second diglycidyl ether based on the same materials (EEW 188) were added at 100° C. to 465 g of hexamethylenediamine (4 mol). Excess diamine was then stripped off at 200° C. and 30 mbar.

To the reaction product were added 58 g of stearic acid (0.20 mol), 175 g of dimeric fatty acid (0.31 mol) and 115 g of xylene. The water of reaction was distilled off azeotropically at 175°–180° C. and the product was diluted with 60 g of butylglycol and 300 g of isobutanol.

110 g of this solution were ball milled with 36 g of ethylene glycol monobutyl ether, 3 g of acetic acid, 170 g of titanium dioxide, 18 g of lead silicate, 4.5 g of carbon black and 170 g of water to a particle size of <7 μm.

2. Electrocoating

The cathodic electrocoating baths were prepared by mixing dispersions of a novel resin and of a base resin and the pigment paste and adjusting the mixture with water to a solids content of 20% by weight. 15 g of 1,2-propylene glycol monophenyl ether were added. The baths were aged for one week. Electrocoating took place at 27° C. Further details are discernible from the table.

3. Corrosion Protection Test

Test panels were coated in a thickness of 23 μm.

Cyclic Exposure Test (to DIN 50 021)

The phosphatized test panels are exposed to the following, varying conditions:

| Day 1 | 24 h room atmosphere, room temperature |
| --- | --- |
| Day 2 | 24 h salt spray, 35° C. |
| Days 3–6 | 8 h condensed water atmosphere at 40° C. |
|  | 20 h condensed water atmosphere at room temperature |
| Day 7 | 24 h room atmosphere, room temperature |
| Duration | 10 cycles = 1680 hours |

Scab Test (General Motors TM 54-26)

The phosphatized test panels are exposed to the following, varying conditions:

| Day 1 | 1 h 60° C. |
| --- | --- |
|  | 0.5 h −23° C. |
|  | 0.25 h in 5% aqueous NaCl solution |
|  | 1.25 h air drying |
|  | 21 h 60° C. at 85% relative humidity |
| Days 2–5: | 0.25 h in 5% aqueous NaCl solution |
|  | 1.25 h air drying |
|  | 22.5 h at 60° C. at 85% relative humidity |
| Days 6–7: | 24 h at 60° C. at 85% relative humidity |
| Duration: | 4 cycles = 672 hours |

Salt Spray Test (to DIN 50 017)

The untreated panels are exposed at 35° C. to a 5% salt solution applied as a fine fog in a spray chamber. Duration: 480 hours All the tests are followed by a measurement of the under-penetration at the score in mm (to DIN 50 017).

TABLE

| No. | Composition of coating bath Amount [g] | | Electrocoating voltage [V] | Baking temperature [°C.] | Cyclic exposure test [mm] | Scab test [mm] | Salt spray test [mm] | Remarks |
|---|---|---|---|---|---|---|---|---|
| 1 | A1* | 926 | 280-330 | 130 | 0.41 | 1.05 | 0.33 | bath unchanged at 8 weeks, acetone-resistant |
|   | B1* | 1062 | | | | | | |
|   | P | 775 | | | | | | |
| 2 | A2* | 926 | 250-280 | 120 | 0.59 | 1.16 | 0.63 | acetone-resistant |
|   | B1* | 1062 | | | | | | |
|   | P | 775 | | | | | | |
| 3 | A1* | 926 | 280-330 | 120 | 0.43 | 1.13 | 0.59 | bath unchanged at 8 weeks, |
|   | B2* | 1062 | | | | | | |
|   | P | 775 | | | | | | |
| 4 | A2* | 926 | 280-310 | 120 | 0.35 | 1.06 | 0.68 | bath unchanged at 8 weeks |
|   | B2* | 1062 | | | | | | |
|   | P | 775 | | | | | | |

*as dispersion

We claim:

1. A process for preparing epoxy resins, with urethane groups, containing on average per molecule from 0.5 to 5 groups of the formula I

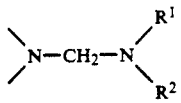

where the substituents $R^1$ and $R^2$ are $C_1$–$C_8$-alkyl groups which may also be linked together to form five- or six-membered rings, which rings may contain an oxygen atom, or $R^1$ and $R^2$ are each phenyl, which process comprises
   a) reacting a hydroxylic epoxy resin via the majority of its secondary hydroxyl groups with a monofunctional isocyanate which additionally contains at least one capped isocyanate group in the molecule, and
   b) further reacting the reaction product of (a) via the NH groups of the capped isocyanate or urethane groups with formaldehyde or a formaldehyde donor and with a secondary amine $HNR^1R^2$ in such a way that the reaction product contains from 0.5 to 5 groups of the formula I per molecule.

2. A crosslinkable binder suitable for cathodic electrocoating, comprising the following distinct components:
   A) 5–50% by weight of an epoxy resin with urethane groups which on average contains per molecule from 0.5 to 5 groups of the formula I

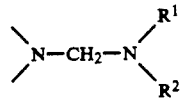

where the substituents $R^1$ and $R^2$ are $C_1$–$C_8$-alkyl groups, which may also be linked together to form five- or six-membered rings, which rings may contain an oxygen atom, or $R^1$ and $R^2$ are each phenyl, said component A being prepared by
   a) reacting a hydroxylic epoxy resin via the majority of its secondary hydroxyl groups with a monofunctional isocyanate which additionally contains at least one capped isocyanate group in the molecule, and
   b) further reacting this reaction produce via the NH groups of the capped isocyanate or urethane groups with formaldehyde or a formaldehyde donor and with secondary amine $HNR^1R^2$ in such a way that the reaction product contains from 0.5 to 5 groups of the formula I per molecule, and
   B) 50–95% by weight of a polymer with primary and/or secondary amino groups whose amino number is from 100 to 150.

3. Epoxy resin with urethane groups, obtained by
   a) reacting a hydroxylic epoxy resin via the majority of its secondary hydroxyl groups with a monofunctional isocyanate which additionally contains at least one capped isocyanate group in the molecule, and
   b) further reacting this reaction product via the NH groups of the capped isocyanate or urethane groups with formaldehyde or a formaldehyde donor and with a secondary amine $HNR^1R^2$ in such a way that the reaction product contains per molecule from 0.5 to 5 groups of the formula I

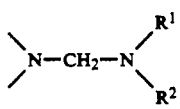

where the substituents $R^1$ and $R^2$ are $C_1$–$C_8$-alkyl groups, which may also be linked together to form five- or six-membered rings, which rings may contain an oxygen atom, or $R^1$ and $R^2$ are each phenyl.

4. An electrocoating process, which comprises coating an article by cathodic electro-deposition of a crosslinkable binder comprising the following distinct components:
   A) 5–50% by weight of an epoxy resin with urethane groups which on average contains per molecule from 0.5 to 5 groups of the formula I

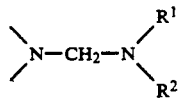

(I)

where the substituents $R^1$ and $R^2$ are $C_1$-$C_8$-alkyl groups, which may also be linked together to form five- or six-membered rings, which rings may contain an oxygen atom, or $R^1$ and $R^2$ are each phenyl, said component A being prepared by a) reacting a hydroxylic epoxy resin via the majority of its secondary hydroxyl groups with a monofunctional isocyanate which additionally contains at least one capped isocyanate group in the molecule, and b) further reacting the reaction product of (a) via the NH groups of the capped isocyanate or urethane groups with formaldehyde or a formaldehyde donor and with a secondary amine $HNR^1R^2$ in such a way that the reaction product contains from 0.5 to 5 groups of the formula I per molecule, and B) 50–95% by weight of a polymer with primary and/or secondary amino groups whose amine number is from 100 to 150.

5. A coated article obtained by coating the article with a binder as defined in claim 2.

* * * * *